United States Patent [19]
Marts

[11] Patent Number: 5,823,138
[45] Date of Patent: Oct. 20, 1998

[54] CAT LITTER SEPARATOR

[76] Inventor: William M. Marts, 8314 Steamside, Houston, Tex. 77088-2713

[21] Appl. No.: 992,142

[22] Filed: Dec. 17, 1997

[51] Int. Cl.[6] .................................................. A01K 29/00
[52] U.S. Cl. ............................................................. 119/166
[58] Field of Search ................................... 119/161, 165, 119/166

[56] References Cited

U.S. PATENT DOCUMENTS

| | | | |
|---|---|---|---|
| 4,120,264 | 10/1978 | Carter | 119/166 |
| 4,327,667 | 5/1982 | Bilak | 119/166 |
| 4,846,104 | 7/1989 | Pierson, Jr. | 119/166 |
| 5,509,379 | 4/1996 | Hoeschen | 119/166 |
| 5,551,375 | 9/1996 | Flores | 119/166 |

*Primary Examiner*—Thomas Price

[57] ABSTRACT

A cat litter separator is provided including a housing with a top opening and an interior space. A pair of square containers are each situated at an elevation below the top opening of the housing. A chute is situated within the housing and below the top opening. The chute has at least one screen, whereby cat litter having clumps of fecal matter may be deposited within the top opening such that the cat litter sifts downwardly into one of the containers and the fecal matter is deposited in another one of the containers.

8 Claims, 2 Drawing Sheets

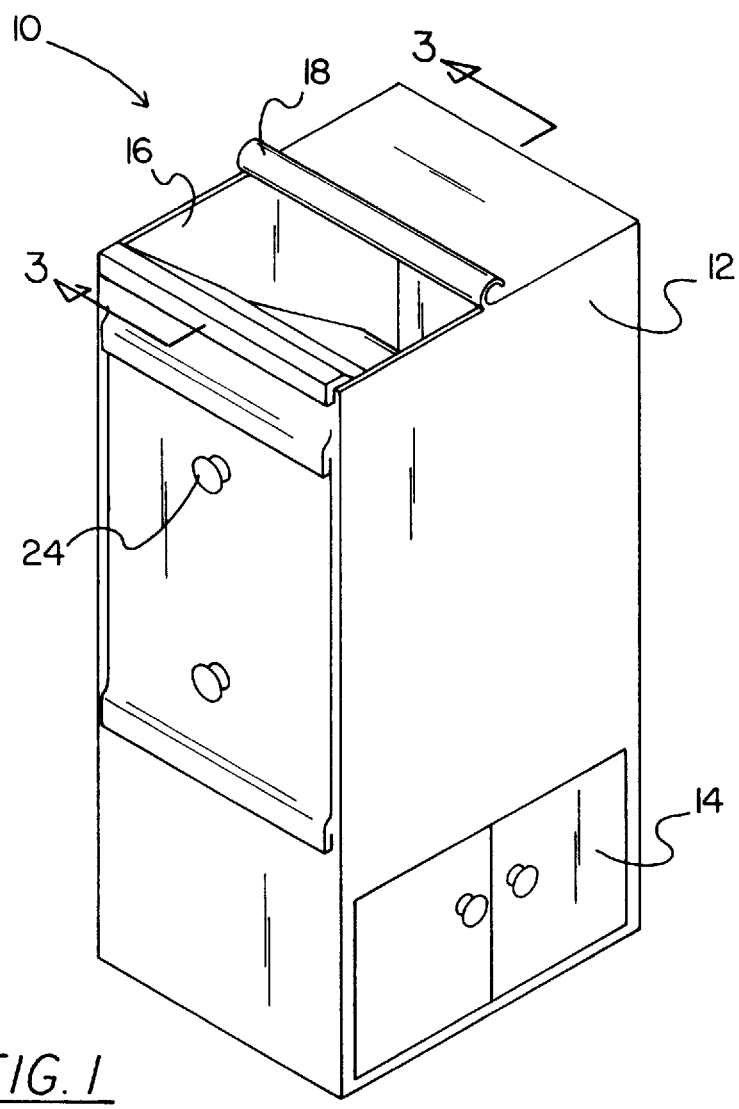
FIG. 1
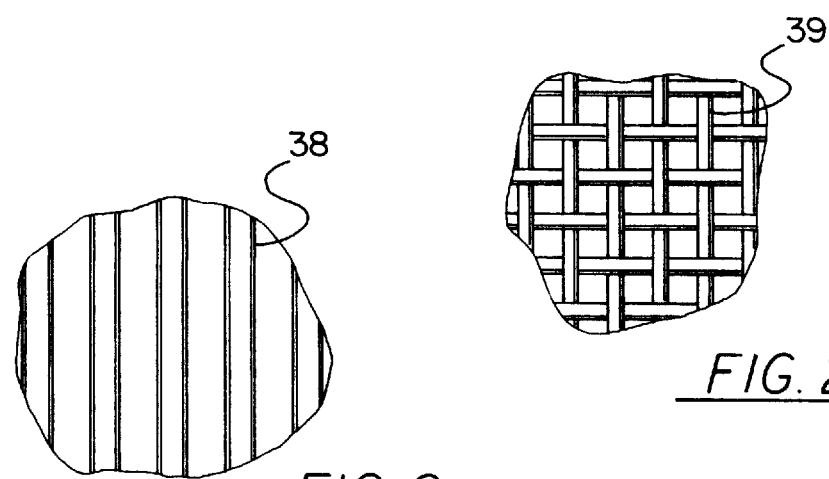
FIG. 2a
FIG. 2b

CAT LITTER SEPARATOR

BACKGROUND OF THE INVENTION

1. Field of the Invention

The present invention relates to cat litter sifters and more particularly pertains to a new cat litter separator for recycling cat litter.

2. Description of the Prior Art

The use of cat litter sifters is known in the prior art. More specifically, cat litter sifters heretofore devised and utilized are known to consist basically of familiar, expected and obvious structural configurations, notwithstanding the myriad of designs encompassed by the crowded prior art which have been developed for the fulfillment of countless objectives and requirements.

Known prior art cat litter sifters include U.S. Pat. No. 4,217,857; U.S. Pat. No. 5,419,282; U.S. Pat. No. 4,723,510; U.S. Pat. No. 5,325,815; U.S. Pat. No. 4,817,560; and U.S. Pat. Des. 351,489.

In these respects, the cat litter separator according to the present invention substantially departs from the conventional concepts and designs of the prior art, and in so doing provides an apparatus primarily developed for the purpose of recycling cat litter.

SUMMARY OF THE INVENTION

In view of the foregoing disadvantages inherent in the known types of cat litter sifters now present in the prior art, the present invention provides a new cat litter separator construction wherein the same can be utilized for recycling cat litter.

The general purpose of the present invention, which will be described subsequently in greater detail, is to provide a new cat litter separator apparatus and method which has many of the advantages of the cat litter sifters mentioned heretofore and many novel features that result in a new cat litter separator which is not anticipated, rendered obvious, suggested, or even implied by any of the prior art cat litter sifters, either alone or in any combination thereof.

To attain this, the present invention generally comprises a rectangular housing having a front face, a rear face, a top face, a bottom face, and a pair of side faces for defining an interior space. One of the side faces has a pair of doors hingably coupled within a rectangular cut out formed in the housing. Such doors are positioned adjacent to the bottom face for allowing access to the interior space, as shown in FIG. 1. The top face of the housing has a top opening formed therein adjacent to the front face thereof. An arcuate flange is coupled along an edge of the top opening which defines a portion of a cylinder. The housing further has a divider having an inverted V-shaped vertical cross-section. The divider is mounted between the side walls just above the doors for reasons that will soon become apparent. FIG. 3 depicts a pair of square containers each with an open top and a bottom face. Such bottom face has a surface area half that of the bottom face of the housing. As such, the square containers are adapted to be removably rested on the bottom face of the housing and situated within the interior space thereof between the divider. With reference still to FIG. 3, a chute is shown having a generally Z-shaped configuration. The chute has a top angled portion situated within the housing and extending downwardly from the top opening thereof and toward the rear face of the housing. A top face of the top angled portion has a first screen mounted in coplanar relationship therewith. Further, a bottom face of the top angled portion has a second screen mounted in coplanar relationship therewith. The chute further includes an intermediate angled portion situated within the housing and extended downwardly from the top angled portion toward the front face of the housing. The intermediate angled portion has a top face and a bottom face being closed. The chute further has a bottom angled portion situated within the housing. The bottom angled portion is extended downwardly from the intermediate angled portion and toward the rear face of the housing. The bottom angled portion terminates at a rear extent of the divider. It should be noted that a bottom face of the bottom angled portion has a third screen mounted in coplanar relationship therewith and a top face that is closed.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new cat litter separator apparatus and method which has many of the advantages of the cat litter sifters mentioned heretofore and many novel features that result in a new cat litter separator which is not anticipated, rendered obvious, suggested, or even implied by any of the prior art cat litter sifters, either alone or in any combination thereof.

It is another object of the present invention to provide a new cat litter separator which may be easily and efficiently manufactured and marketed.

It is a further object of the present invention to provide a new cat litter separator which is of a durable and reliable construction.

An even further object of the present invention is to provide a new cat litter separator which is susceptible of a low cost of manufacture with regard to both materials and labor, and which accordingly is then susceptible of low prices of sale to the consuming public, thereby making such cat litter separator economically available to the buying public.

Still yet another object of the present invention is to provide a new cat litter separator which provides in the apparatuses and methods of the prior art some of the advantages thereof, while simultaneously overcoming some of the disadvantages normally associated therewith.

Still another object of the present invention is to provide a new cat litter separator for recycling cat litter.

Even still another object of the present invention is to provide a new cat litter separator that includes a housing with a top opening and an interior space. A pair of square containers are each situated at an elevation below the top opening of the housing. A chute is situated within the housing and below the top opening. The chute has at least one screen, whereby cat litter having clumps of fecal matter may be deposited within the top opening such that the cat litter sifts downwardly into one of the containers and the fecal matter is deposited in another one of the containers.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new cat litter separator according to the present invention.

FIG. 2a is a top view of one of the screens of the present invention.

FIG. 2b is a top view of another one of the screens of the present invention.

DESCRIPTION OF THE PREFERRED EMBODIMENT

Figure 3:
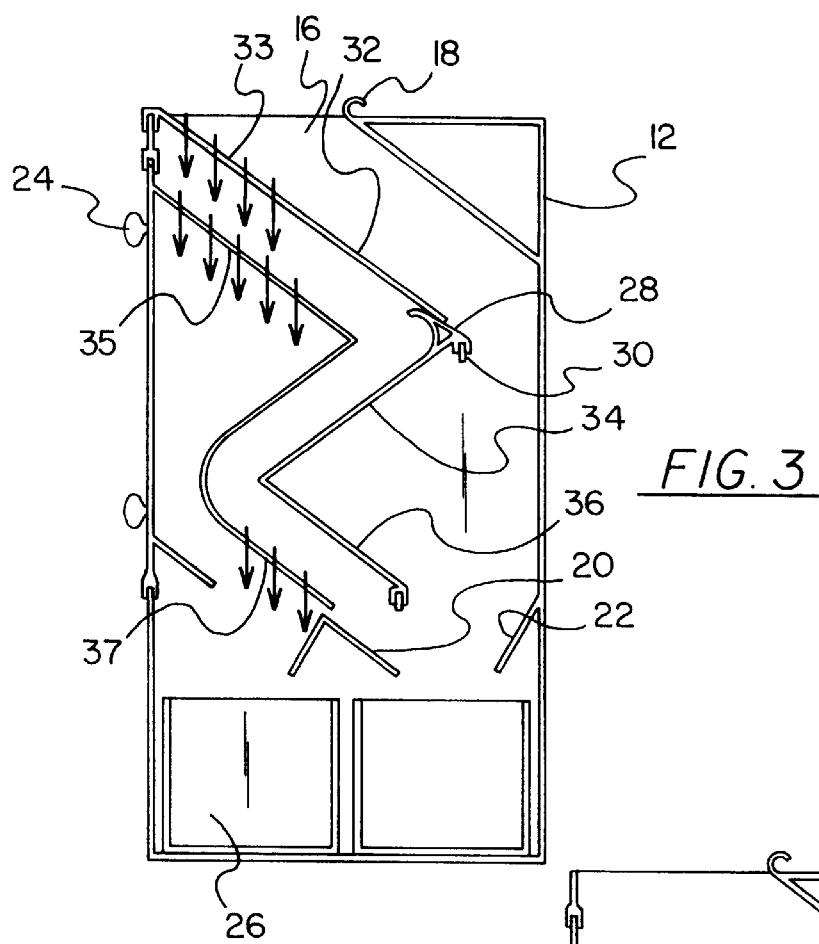
FIG. 3 is a side cross-sectional view of the present invention taken along line 3—3 shown in FIG. 1.
Figure 4:
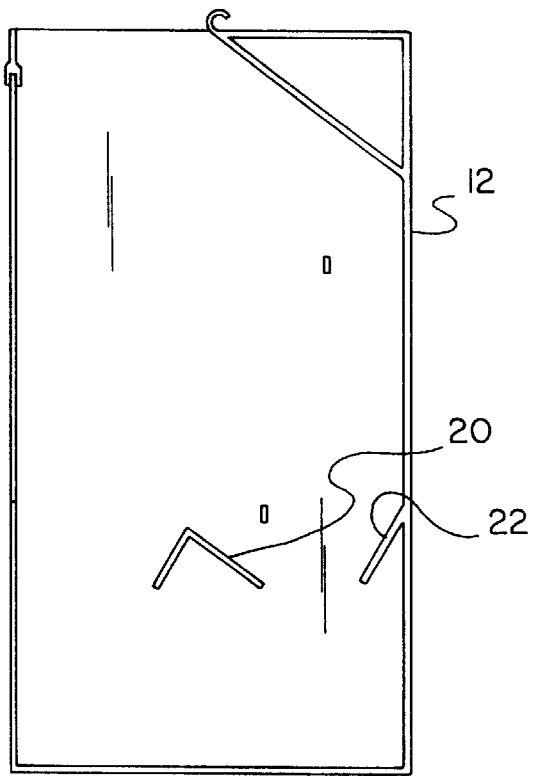
FIG. 4 is a side cross-sectional view of the present invention with the chute removed.

With reference now to the drawings, and in particular to FIGS. 1 through 4 thereof, a new cat litter separator embodying the principles and concepts of the present invention and generally designated by the reference numeral 10 will be described.

The present invention, designated as numeral 10, includes a rectangular housing 12 having a front face, a rear face, a top face, a bottom face, and a pair of side faces for defining an interior space. One of the side faces has a pair of doors 14 hingably coupled within a rectangular cut out formed in the housing. Such doors are positioned adjacent to the bottom face for allowing access to the interior space, as shown in FIG. 1. The top face of the housing has a top opening 16 formed therein adjacent to the front face thereof. An arcuate flange 18 is coupled along an edge of the top opening which defines a portion of a cylinder.

The housing further has a divider 20 having an inverted V-shaped vertical cross-section. The divider is mounted between the side walls just above the doors for reasons that will soon become apparent. Associated therewith is an angled plate 22 mounted to both the front and rear face of the housing and extending inwardly and downwardly therefrom. Further, it is preferred that the front face of the housing be capable of the being removed. To facilitate such removal, a plurality of gripping knobs 24 are formed on the front face.

FIG. 3 depicts a pair of square containers 26 each with an open top and a bottom face. Such bottom face has a surface area half that of the bottom face of the housing. As such, the square containers are adapted to be removably rested on the bottom face of the housing and are situated within the interior space thereof between the divider.

With reference still to FIG. 3, a chute 28 is shown having a generally Z-shaped configuration. In use, the chute is preferably removably coupled within the interior space of the housing and easily removed therefrom after the front face is removed. The chute is coupled to the housing via a plurality of tab and groove combination fasteners 30.

The chute has a top angled portion 32 situated within the housing and extending downwardly from the top opening thereof and toward the rear face of the housing. A top face of the top angled portion has a first screen 33 mounted in coplanar relationship therewith. Further, a bottom face of the top angled portion has a second screen 35 mounted in coplanar relationship therewith. In the preferred embodiment, the top face is removably coupled to the chute for reasons to be set forth hereinafter.

The chute further includes an intermediate angled portion 34 situated within the housing and extended downwardly from the top angled portion toward the front face of the housing. The intermediate angled portion has a top face and a bottom face being closed. The chute further has a bottom angled portion 36 situated within the housing. The bottom angled portion is extended downwardly from the intermediate angled portion and toward the rear face of the housing. The bottom angled portion terminates at a rear extent of the divider. Ideally, each angled portion defines an angle of approximately 36 degrees with respect to the horizontal. It should be noted that a bottom face of the bottom angled portion has a third screen 37 mounted in coplanar relationship therewith and a top face that is closed. Further, a bottom end of each angled portion of the chute terminates short of the front and rear wall.

As shown in FIGS. 2a & 2b, a pair of screen types are shown. Each of the aforementioned screens consist of one of these types. First, as shown in FIG. 2a, a first screen type 38 includes only a plurality of linear wires spaced a predetermined distance in parallel. Shown in FIG. 2b is a second screen type 39 including a matrix of intersecting wires which are spaced less than the predetermined distance. Preferably, the first screen type is employed above the second screen type.

By this structure, cat litter having clumps of fecal matter may be deposited within the top opening such that the cat litter sifts downwardly into one of the containers adjacent the front face of the housing. This is accomplished through two paths one of which includes through the first and second screen and subsequently over the top face of the bottom angled portion. Secondly, the cat litter may flow through the top and intermediate angled portions and exit via the third screen. With regard to the fecal matter, the same may be deposited in one of the containers adjacent the rear face of the housing by one of two paths, similar to the cat litter. Such paths included either, through the entire chute or over the top face of the top angled portion.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cat litter separator comprising, in combination:
   a rectangular housing having a front face, a rear face, a top face, a bottom face, and a pair of side faces for defining an interior space, one of the side faces having a pair of doors hingably coupled within a rectangular cut out formed in the housing adjacent to the bottom face for allowing access to the interior space, the top face having a top opening formed therein adjacent to the front face thereof and an arcuate flange coupled along an edge of the top opening which defines a portion of a cylinder, the housing further having a divider having an inverted V-shaped vertical cross-section with the divider mounted between the side walls just above the doors;
   a pair of square containers each with an open top and a bottom face having a surface area half that of the bottom face of the housing, the square containers adapted to be removably rested on the bottom face of the housing and situated within the interior space thereof between the divider;
   a chute having a generally Z-shaped configuration including a top angled portion situated within the housing and extending downwardly from the top opening thereof and toward the rear face of the housing, a top face of the top angled portion having a first screen mounted in coplanar relationship therewith and a bottom face of the top angled portion having a second screen mounted in coplanar relationship therewith, the chute further including an intermediate angled portion situated within the housing and extending downwardly from the top angled portion toward the front face of the housing with the intermediate portion having a top face and a bottom face being closed, the chute further having a bottom angled portion situated within the housing and extending downwardly from the intermediate angled portion and toward the rear face of the housing and terminating at a rear extent of the divider, a bottom face of the bottom angled portion having a third screen mounted in coplanar relationship therewith and a top face that is closed;
   whereby cat litter having clumps of fecal matter is deposited within the top opening such that the cat litter sifts downwardly into one of the containers adjacent the front face of the housing and the fecal matter is deposited in one of the containers adjacent the rear face of the housing.

2. A cat litter separator comprising:
   a housing with a top opening and an interior space;
   a pair of containers each situated at an elevation below the top opening of the housing;
   a chute situated within the housing and below the top opening, the chute having at least one screen, wherein cat litter having clumps of fecal matter are deposited within the top opening and the cat litter sifts downwardly into one of the containers and the fecal matter is deposited in another one of the containers;
   wherein the chute has a generally zig-zag configuration and a plurality of portions at least two of which have a screen mounted thereon.

3. A cat litter separator as set forth in claim 2 wherein a divider is mounted within the housing between the chute and the containers.

4. A cat litter separator as set forth in claim 2 wherein at least a portion of the chute is angled at approximately 36 degrees.

5. A cat litter separator as set forth in claim 2 wherein the containers are situated within the housing.

6. A cat litter separator as set forth in claim 5 wherein at least one door allows access to the containers within the housing.

7. A cat litter separator as set forth in claim 2 wherein the top opening has an arcuate flange mounted adjacent thereto.

8. A cat litter separator as set forth in claim 2 wherein the chute is removably coupled to the housing.

* * * * *